(12) United States Patent
Stevens et al.

(10) Patent No.: US 6,173,849 B1
(45) Date of Patent: Jan. 16, 2001

(54) TERMINATION OF POWER AND COMMUNICATIONS TRAINLINE OF ELECTRO-PNEUMATIC BRAKES

(75) Inventors: Dale R. Stevens, Adams Center; Anthony W. Lumbis, Watertown, both of NY (US)

(73) Assignee: New York Air Brake Corporation, Watertown, NY (US)

(*) Notice: Under 35 U.S.C. 154(b), the term of this patent shall be extended for 0 days.

(21) Appl. No.: 09/119,748

(22) Filed: Jul. 21, 1998

(51) Int. Cl.[7] .................................................. B61G 1/12
(52) U.S. Cl. .......................... 213/1.3; 213/1.6; 303/3; 303/6; 246/182 B; 246/187 C; 246/189
(58) Field of Search ............................ 246/190, 182 B, 246/187 C, 189, 166.1; 213/1.3, 1.6; 303/3, 15; 307/9.1; 191/4

(56) References Cited

U.S. PATENT DOCUMENTS

| | | |
|---|---|---|
| 1,856,455 | 5/1932 | Banks et al. . |
| 3,696,758 | 10/1972 | Godinez, Jr. . |
| 3,868,909 | 3/1975 | Pelabon . |
| 3,901,558 | 8/1975 | Burkett . |
| 4,017,136 * | 4/1977 | Sasgen ................................. 339/28 |
| 4,343,522 * | 8/1982 | O'Neil ................................. 330/10 |
| 4,892,204 | 1/1990 | Lumbis . |
| 5,152,410 | 10/1992 | Ta et al. . |
| 5,315,520 | 5/1994 | Drake et al. . |
| 5,494,342 * | 2/1996 | Engle ..................................... 303/3 |
| 5,630,565 * | 5/1997 | Lumbis ........................... 246/182 B |
| 5,673,876 | 10/1997 | Lumbis et al. . |

\* cited by examiner

Primary Examiner—S. Joseph Morano
Assistant Examiner—Frantz F. Jules
(74) Attorney, Agent, or Firm—Barnes & Thornburg

(57) ABSTRACT

A leading end termination connector on each locomotive and an EP line termination circuit in the leading end termination connector. The leading end connector of a locomotive not connected to an adjacent locomotive is connected to the leading end termination connector. This provides protection for the non-connected leading end connector as well as providing appropriate electrical termination on the EP line.

13 Claims, 3 Drawing Sheets

TERMINATION OF POWER AND COMMUNICATIONS TRAINLINE OF ELECTRO-PNEUMATIC BRAKES

BACKGROUND AND SUMMARY OF THE INVENTION

The present invention relates generally to electrified trains and more specifically a termination for a power and communication trainline for electro-pneumatic brakes.

The locomotive on freight trains generally include a pneumatic as well as electrical connectors. Locomotives include a leading end and a trailing end electrical and pneumatic couplers. When one or more locomotives are used in a consist, the adjacent couplers are connected. Thus, the leading coupler of the lead locomotive and the trailing coupler of the last locomotive are not coupled. Covers or dummy couplers have been provided for the electrical coupler to protect them from the debris and the environment.

In a freight train, historically, there has been no electrical connection to the cars which form part of the train. There has only been pneumatic connections. With the incorporation of electro-pneumatic braking in the freight train industry, the electrical connection of an electro-pneumatic brake control line through the locomotives and each of the cars of the freight train is provided. Each of the locomotives and cars include a leading and trailing electro-pneumatic trainline connector. This carries the control signals as well as the power throughout the train, including the locomotives and the cars. In the present design under consideration by the industry, a two wire system carries 230 VDC and communication signals.

While the trailing connector of the last locomotive is connected to the leading connector of the first car in the train, the lead connector of the lead locomotive is still exposed. In the prior art, the last car in the freight car train has an end-of-train device. With the advent of the electro-pneumatic trainline, the end-of-train device is connected to the trailing connector of the last car. The end-of-train device includes a line termination circuit. To achieve maximum communication performance, the trainline communication should also have a lead end termination. Since trains usually have more than one locomotive, a system must be devised to determine the lead end of the train and provide termination. Termination circuits should not be active in the trailing locomotives.

An example of an electro-pneumatic train brake system is described in U.S. Pat. No. 5,673,876 to Lumbis et al. This is an automatic electric trainline with safety interlock. This Patent is incorporated herein by reference.

The present invention includes a leading end termination connector on each locomotive and an EP line termination circuit in the leading end termination connector. The leading end connector of a locomotive not connected to an adjacent locomotive is connected to the leading end termination connector. This provides protection for the non-connected leading end connector as well as providing appropriate electrical termination on the EP line. Wherein the train includes a consist of a plurality of locomotives, the leading end trainline connector of the first locomotive is connected to the leading end termination connector of the first locomotive. The termination circuit is an impedance matching circuit. Wherein the EP line is an AC line, the termination circuit is an AC impedance matching circuit. An end-of-train device is also connected to the trailing end trainline connector of a car not connected to an adjacent car. The end-of-train device is a portable device and includes an impedance matching circuit. The EP trainline includes at least two conductors which carry power and control signals. The trainline connectors extend from a junction box and the termination connector is connected to the junction box of the leading end trainline connector. A lanyard connects the termination connector to the junction box of the leading end connector.

Other objects, advantages and novel features of the present invention will become apparent from the following detailed description of the invention when considered in conjunction with the accompanying drawings.

BRIEF DESCRIPTION OF THE DRAWINGS

FIG. 4 is a plan view of the termination device according to the present invention.

FIG. 5 is an electro-schematic of the termination circuit incorporating the principles of the present invention.

DETAILED DESCRIPTION OF THE PREFERRED EMBODIMENTS

Figure 1:
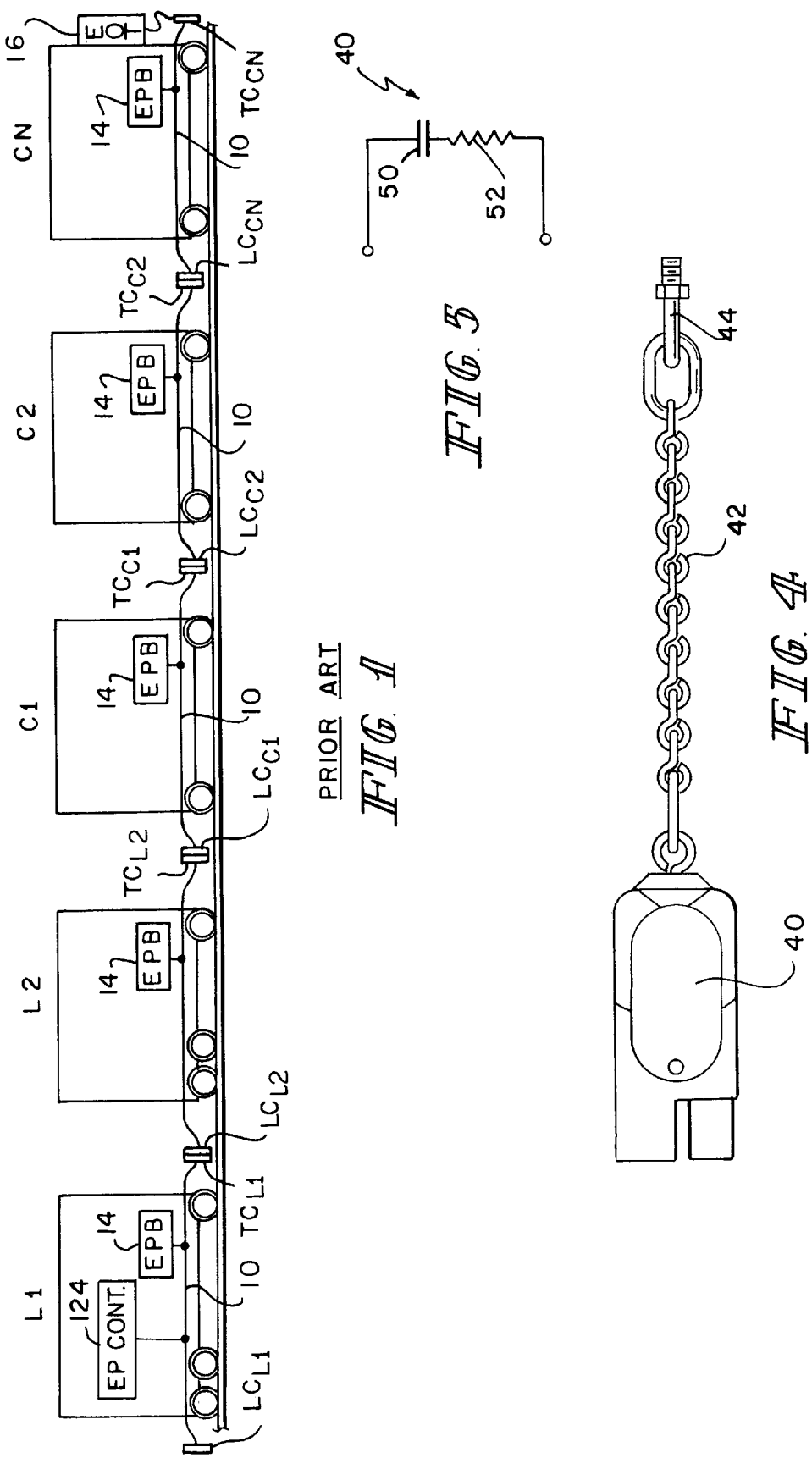
FIG. 1 is a block diagram of an electric pneumatic train including a plurality of locomotives and cars of the prior art.

A train consisting of a plurality of locomotives L1 and L2 and a plurality of cars, C1–CN is illustrated in FIG. 1. An electro-pneumatic trainline 10 runs throughout the train and are interconnected by leading end connectors LC and trailing end connectors TC at each of the locomotives and cars. Electro-pneumatic controller 12 is shown in the lead locomotive L1. Each of the locomotives and cars include an electro-pneumatic brake EPB 14. It should be noted that each of the locomotives would include an electro-pneumatic controller 12 with only the leading or master locomotive being active with the other locomotive's electro-pneumatic controllers being inactive.

The trainline 10, preferably is a pair of power lines but may include other signal lines. The trainline provides communication over the power lines, but the power and communication lines may be separate within the trainline 10. Also, the trainlines may be a dedicated EP trainline or may be part of the normal 27 wire locomotive trainlines. Where the electro-pneumatic trainline 10 transmits control signals as well as power, the control signal is provided as an AC signal over a pair of lines with the power. An example of the system of a prior art is described in the previously mentioned U.S. Pat. No. 5,673,876 which is incorporated herein by reference. This is merely an example of one of the electro-pneumatic brake systems which may be used.

As noted in FIG. 1, the trailing end connector CTCN of the last car CN is connected to an end-of-train device 16. The end-of-train device includes a termination circuit. A typical example of a termination circuit as illustrated in FIG. 5 includes a serial connected capacitor 50 and resistor 52. This is an appropriate termination for an AC trainline as illustrated in FIG. 5. The trailing connectors TC are connected to the leading connectors LC of the adjacent locomotive or car. The leading connector LLC1 of the leading locomotive L1, is not connected since there is no adjacent car.

Figure 2:
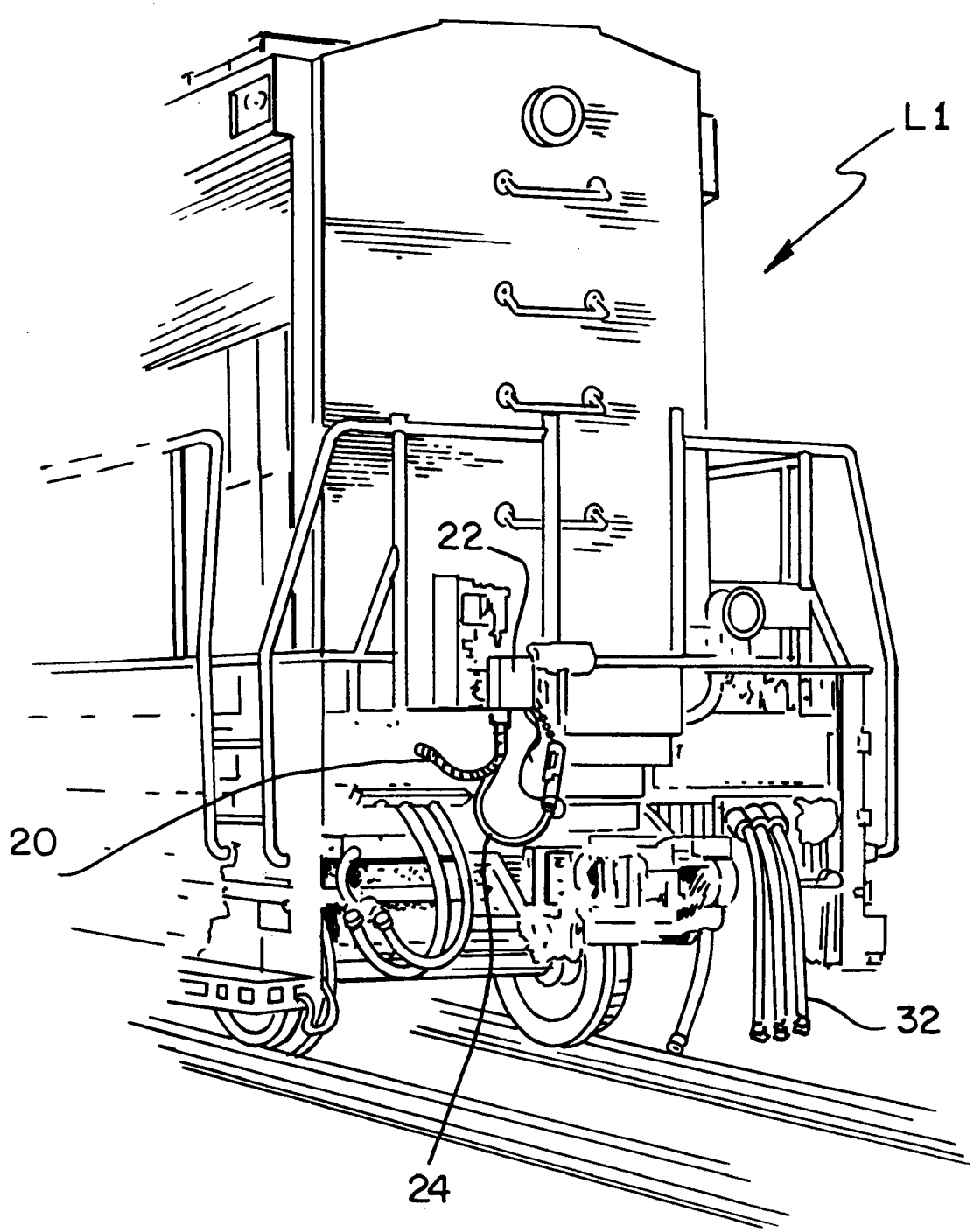
FIG. 2 is a perspective of a leading end of a locomotive incorporating the termination device of the present invention.
Figure 3:
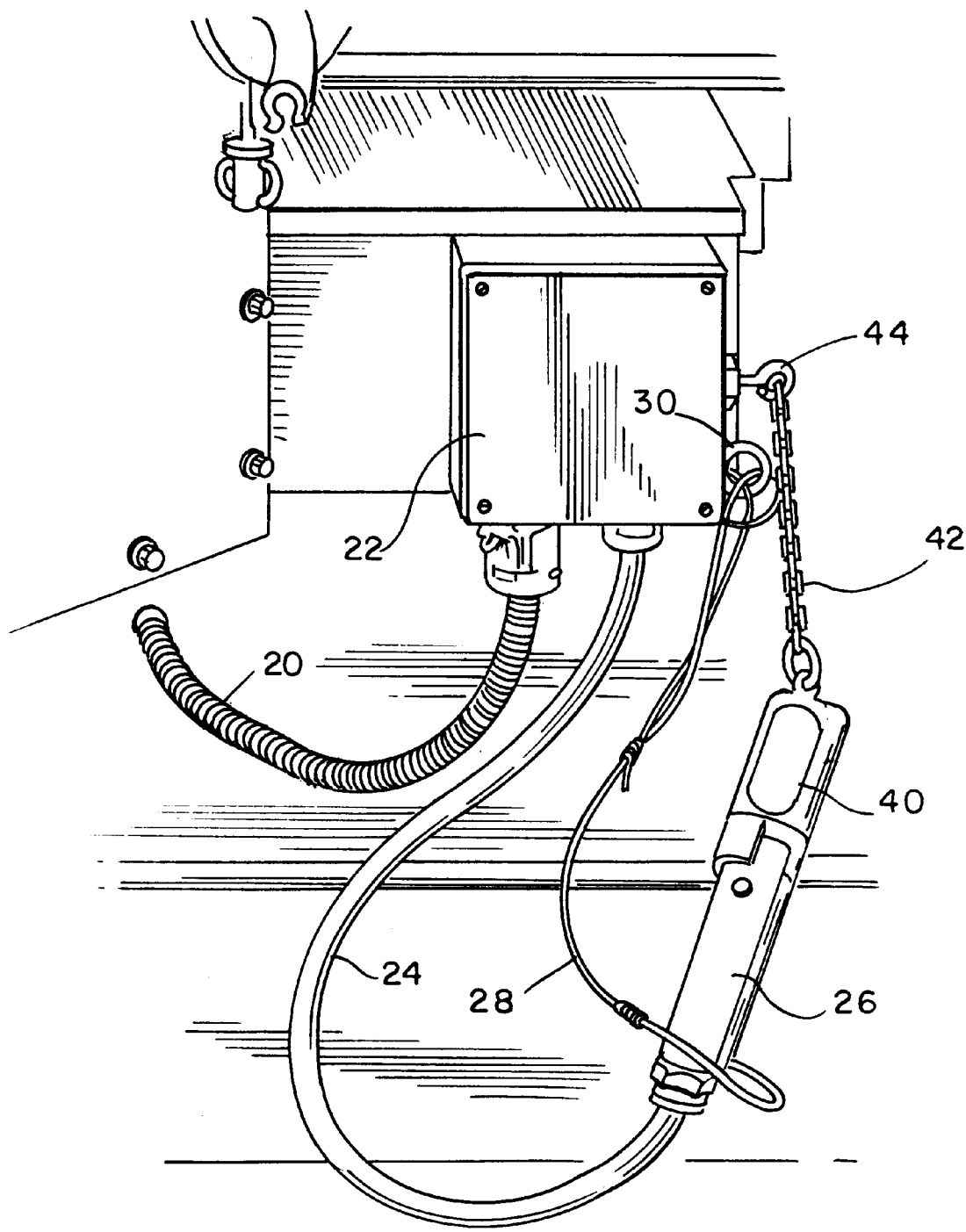
FIG. 3 is a blown up perspective of a portion of FIG. 2.

The termination system of the present invention is illustrated in FIGS. 2 and 3. A cable 20 at the leading end of the locomotive L1 is connected to a junction box 22. Exiting junction box 22 is a leading end connector cable 24 with a connector 26. A lanyard 28 extends between eye hook 30 connected to the junction box 22 or locomotive body and the connector 26. Also connecting to the leading end of the locomotive L1 are pneumatic lines 32 and electric line connectors (not shown). A leading end electric connectors are connected to dummy connectors so as to protect them from the environment and debris. The junction box 22 may be a standard junction box or may include a current sensor, car ID or other information as described in U.S. Ser. No. 08/689,813 filed Aug. 14, 1996.

As illustrated in FIGS. 3 and 4, leading end termination connector 40 is connected by lanyard or chains 42 to eye fastener 44 secured to the junction box 22 or locomotive body at the leading end of each locomotive. The leading end termination connector 40 includes an electrical termination circuit, for example that of FIG. 5 to electrically terminate the line. Also, it mates with the leading end connector 26 to cover the exposed connector and protect it from the environment and debris. It should be noted that the termination of circuit may be that which is appropriate for the electro-pneumatic trainline 10.

With future developments of electro-pneumatic braking on trains, the leading and trailing end connectors may be developed as automatic connectors. If this is the case, the leading end termination connector 40 would then be secured next to the automatic connection of the leading end connector and be inserted directly within the rigid connector structure.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A train including at least one locomotive and a plurality of cars, each of the locomotive and cars having a leading end electric trainline connector and a trailing end electric trainline connector for interconnecting at least one control line to an adjacent locomotive or car and forming an EP train line, each car having an electro-pneumatic brake controlled by an EP controller in the locomotive over said EP trainline, the lead end connector of the locomotive extending from a junction box on the lead end of the locomotive, and further comprising:
    a leading end termination connector on each locomotive;
    an EP train line termination circuit in each leading end termination connector; and
    the leading end connector of a leading locomotive is connected to the leading end termination connector of the leading locomotive.

2. A train according to claim 1, wherein said train includes a plurality of locomotives interconnected by the trainline connectors to form a consist having the leading locomotive and a last locomotive; and the leading end trainline connector of the leading locomotive is connected to the leading end termination connector of the leading locomotive.

3. A train according to claim 1, including a lanyard connecting the termination connector to the junction box of the leading end trainline connector.

4. A train according to claim 1, wherein each trainline connector extends from a junction box, and the termination connector is connected to each locomotive adjacent each junction box that has a leading end trainline connector.

5. A train according to claim 1, wherein the termination circuit is an impedance matching circuit.

6. A train according to claim 1, wherein the termination circuit is an AC impedance matching circuit.

7. A train according to claim 1, including an end of train termination device connected to the trailing end trainline connector of a final car.

8. A train according to claim 7, wherein the end of train termination device is portable.

9. A train according to claim 7, wherein the end of train termination device includes an impedance matching circuit.

10. A train according to claim 1, wherein the EP train line includes at least two conductors which carry power and control signals.

11. A train according to claim 1, wherein the termination circuit is includes a resistor and a capacitor.

12. A train according to claim 11, wherein the resistor and capacitor are in series.

13. A train including at least one locomotive and a plurality of cars, each of the locomotive and cars having a leading end electric trainline connector and a trailing end electric trainline connector for interconnecting at least one control line to an adjacent locomotive or car and forming an EP train line, each car having an electro-pneumatic brake controlled by an EP controller in the locomotive over said EP trainline, the lead end connector of the locomotive extending from a junction box on the lead end of the locomotive, and further comprising:
    a leading end termination connector on each locomotive;
    an EP train line termination circuit in the leading end termination connector; and
    the leading end connector of a leading locomotive is connected to the leading end termination connector of the leading locomotive; wherein,
    each trainline connector extends from a respective junction box; and
    a termination connector is connected to each junction box that has a leading end trainline connector.

* * * * *